United States Patent [19]

Robbins et al.

[11] 4,163,356

[45] Aug. 7, 1979

[54] TREE FRUIT PICKER

[76] Inventors: Robert J. Robbins; Desmond W. Robbins, both of 1036 Biltmore Dr., NW., Winter Haven, Fla. 33880

[21] Appl. No.: 775,945

[22] Filed: Mar. 9, 1977

[51] Int. Cl.² ............................................. A01D 46/24
[52] U.S. Cl. .................................................. 56/328 R
[58] Field of Search ..................... 56/328 R, 330, 332, 56/339, 340, 328 TS; 294/19 R

[56] References Cited

U.S. PATENT DOCUMENTS

| | | | |
|---|---|---|---|
| 988,484 | 4/1911 | McDonald | 56/339 |
| 3,210,921 | 10/1965 | Middlesworth | 56/328 R |
| 3,417,558 | 12/1968 | Granger | 56/328 R |
| 3,427,796 | 2/1969 | McCray | 56/328 R |
| 3,439,481 | 4/1969 | Hall | 56/328 R |
| 3,531,924 | 10/1970 | Stine | 56/328 R |
| 3,541,772 | 11/1970 | Miller | 56/328 R |
| 3,713,282 | 1/1973 | Baker | 56/328 R |
| 3,939,629 | 2/1976 | Bruel | 56/330 |

FOREIGN PATENT DOCUMENTS 105983 5/1917 United Kingdom ...................... 56/332

Primary Examiner—Jay N. Eskovitz
Attorney, Agent, or Firm—Clarence A. O'Brien; Harvey B. Jacobson

[57] ABSTRACT

A structure is provided which may be advanced into the limb area of a fruit tree and which defines a plurality of outwardly opening fruit stem engaging notches. The notches include narrow open outer ends and wide inner ends and are inclined to discourage the entry of fruit bearing stems into the notches as the structure is advanced into a fruit tree limb area and to encourage movement of fruit bearing stems into the notches as the structure is withdrawn from a fruit tree limb area. A first basic form of the invention comprises a manually operable elongated wand-type tool with the notches thereon spaced longitudinally along the tool. A second form of the invention includes a plurality of generally parallel support rods mounted at one pair of corresponding ends from a support for equal and simultaneous oscillation about a longitudinal axis and a third form of the invention includes a plurality of axially spaced and aligned support disks mounted on a support shaft journaled for rotation about its longitudinal axis and with the notches of the third form spaced about the peripheral portions of the disks.

6 Claims, 10 Drawing Figures

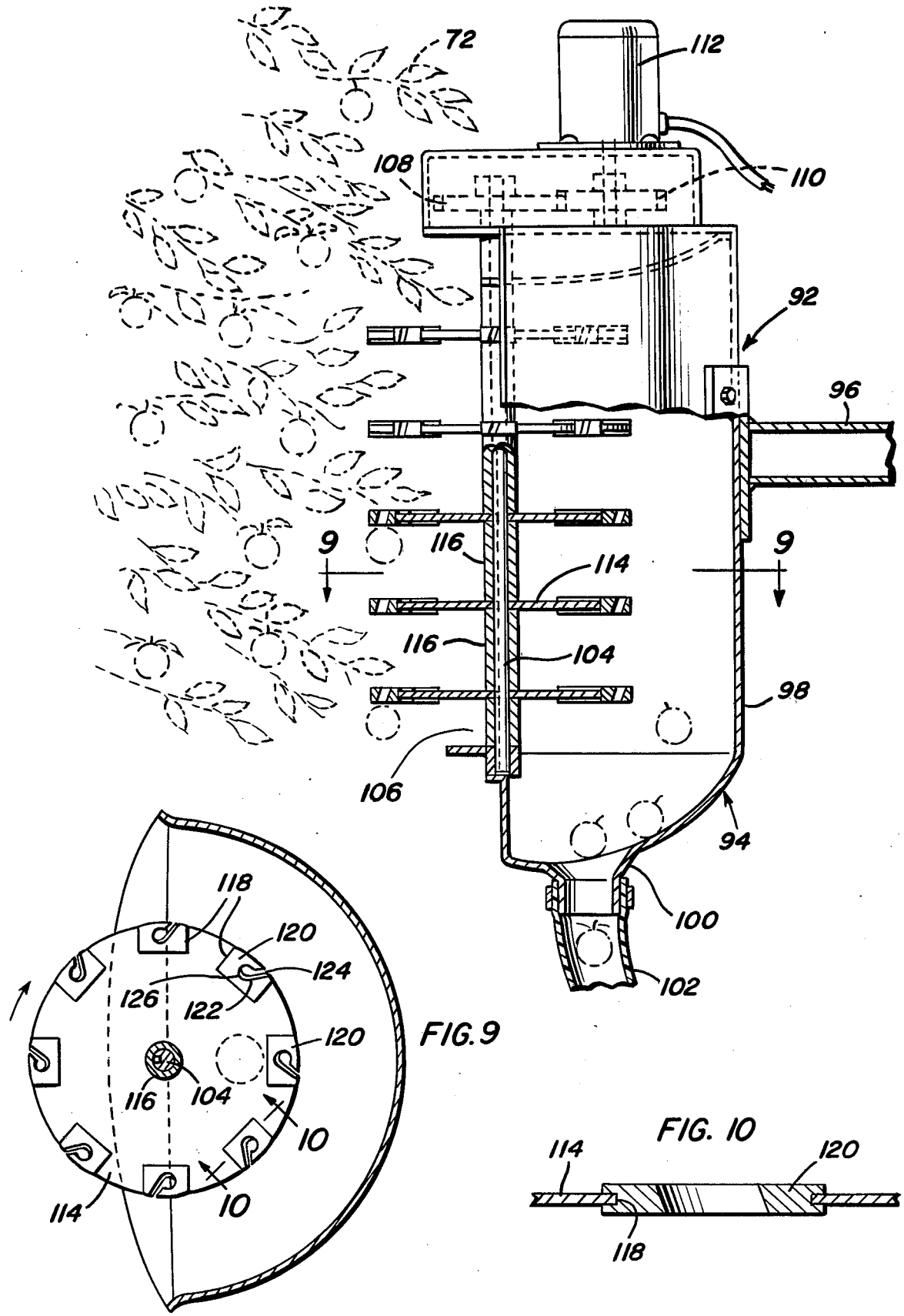

TREE FRUIT PICKER

BACKGROUND OF THE INVENTION

Various forms of fruit picking apparatus have been heretofore designed, but most of the previously known fruit picking devices are specifically designed for picking one particular type of fruit and are not readily adaptable for manual as well as power operation.

Examples of various forms of fruit picking devices including some of the general structural and opertional features of the instant invention are disclosed in U.S. Pat. Nos. 988,484, 1,008,470, 3,522,696, 3,561,205, 3,623,306 and 3,827,221.

BRIEF DESCRIPTION OF THE INVENTION

The fruit picking apparatus of the instant invention utilizes three different forms of picking heads, but each form of head is provided with substantially similar fruit bearing tree twig receiving and engaging notches therein. Each notch includes a narrow outer open end and a wider inner closed end. Once a fruit bearing stem enters a notch it is directed into the larger inner end thereof through which leaves and branch twigs and the like may be withdrawn until the limit of the tree limb travel is reached, at which point the fruit to be picked is engaged by the head and is stripped from the supporting twig or stem.

The main object of this invention is to provide a fruit picker which may be manually operated in its basic form and which may also be provided in a plurality of forms adapted to be power operated.

Another important object of this invention is to provide a fruit picker operable in a manner enabling fruit to be picked from a tree without causing the lower stems of the branches of the tree to be damaged.

A further object of this invention is to provide a fruit picker for picking fruit from trees and which is readily adaptable for use in picking different forms of tree fruit.

A final object of this invention to be specifically enumerated herein is to provide a fruit picker in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE FIGURES

FIG. 8 is a side elevational view of a third form of picker head constructed in accordance with the present invention utilizing a rotary picking assembly and with parts of the head and rotary picking assembly being broken away and illustrated in vertical section;

FIG. 9 is a horizontal sectional view taken substantially upon the plane indicated by the section line 9—9 of FIG. 8; and FIG. 10 is an enlarged, fragmentary sectional view taken substantially upon the plane indicated by the section line 10—10 of FIG. 9.

DESCRIPTION OF THE PREFERRED EMBODIMENTS

Figure 1:
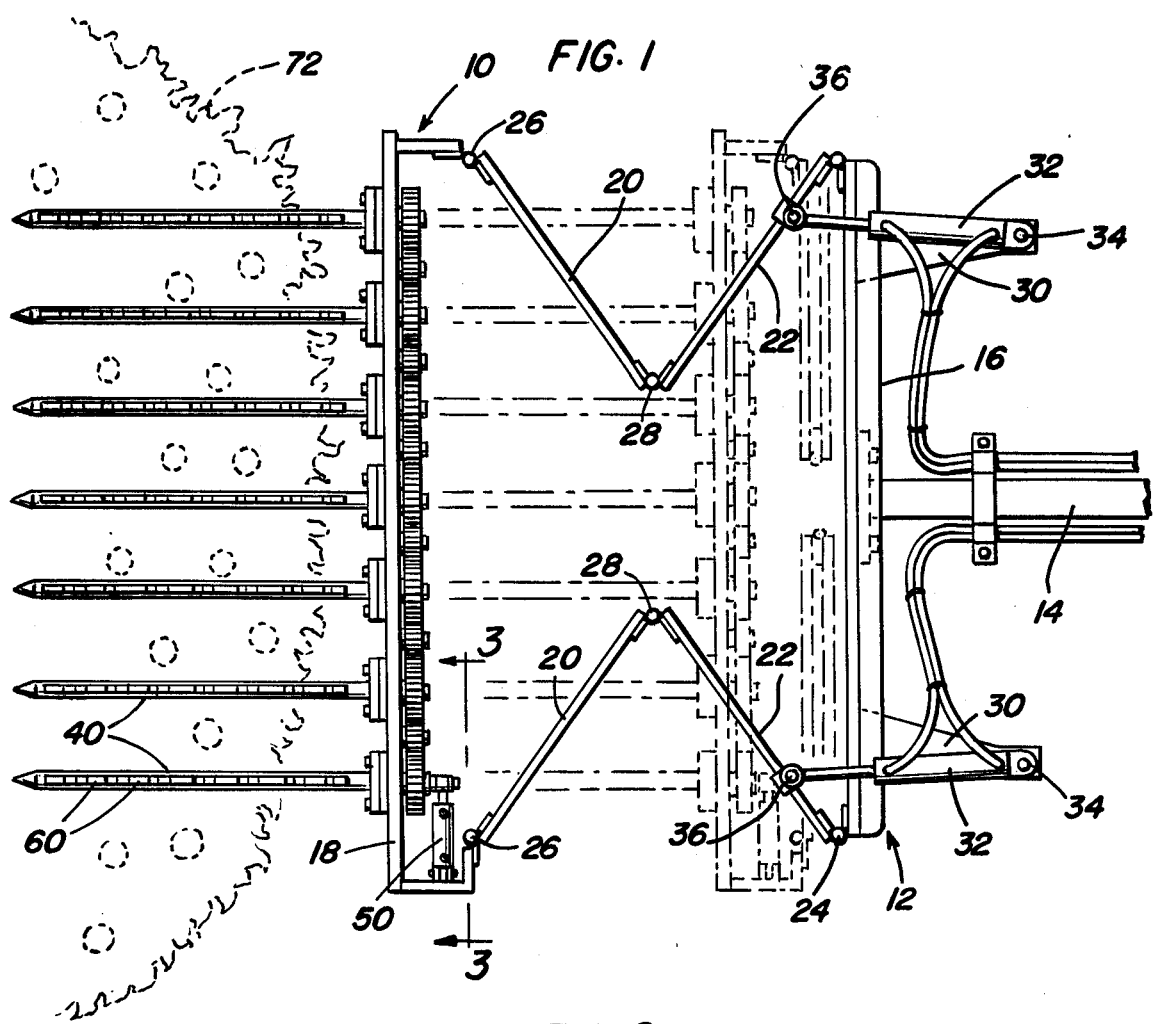
FIG. 1 is a top plan view of a first form of tree fruit picking head constructed in accordance with the present invention.
Figure 2:
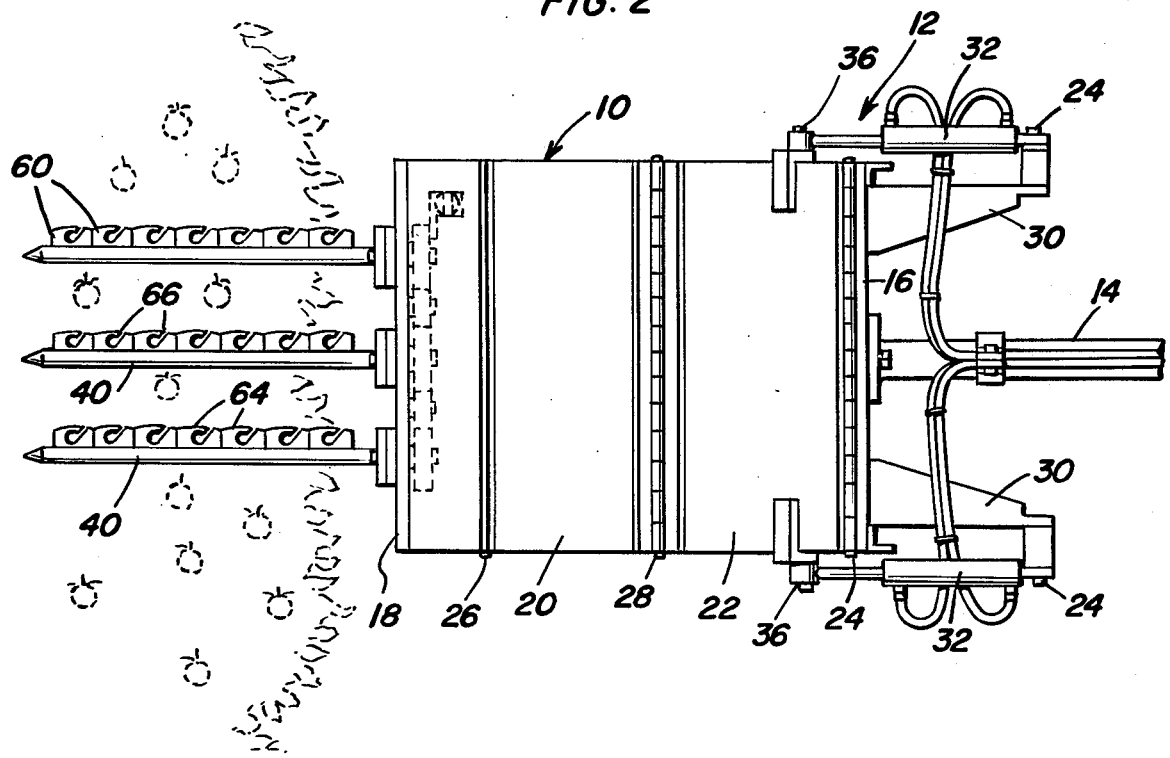
FIG. 2 is a side elevational view of the assemblage illustrated in FIG. 1.
Figure 3:
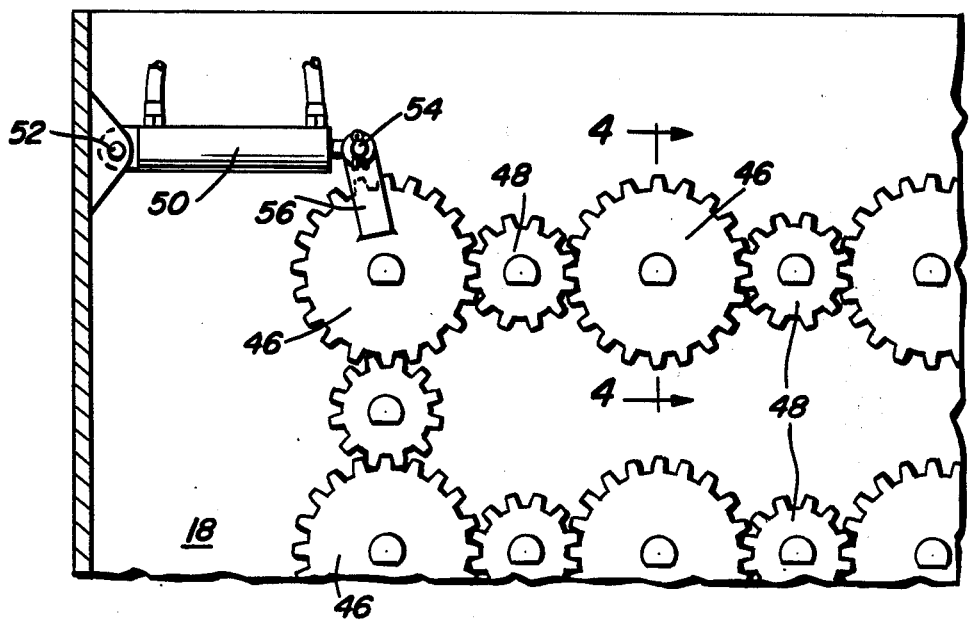
FIG. 3 is a fragmentary, enlarged, vertical sectional view taken substantially upon the plane indicated by the section line 3—3 of FIG. 1.
Figure 4:
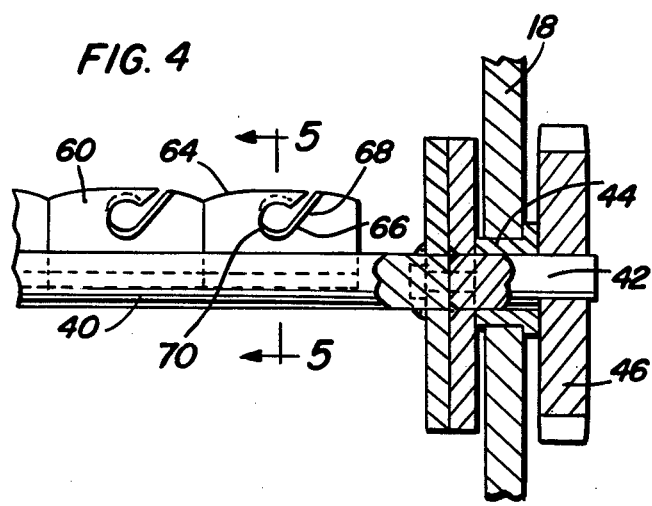
FIG. 4 is a fragmentary, enlarged, vertical sectional view taken substantially upon the plane indicated by the section line 4—4 of FIG. 3.

Referring now more specifically to the drawings, the numeral 10 generally designates a first form of picker constructed in accordance with the present invention. The picker 10 includes a head assembly referred to in general by the reference numeral 12. The head assembly 12 is supported from any suitable form of support boom 14 and the boom 14 includes a base end (not shown) supported from a mobile vehicle chassis for vertical and angular adjustment about horizontal and vertical axes relative to the chassis.

The free end of the boom 14 supports a base plate 16 therefrom and a mounting plate 18 is supported from the base plate 16 by means of pairs of pivotally connected plates 20 and 22. One pair of corresponding marginal edge portions of the plates 22 are hingedly supported from opposite side marginal portions of the base plate 16 by means of vertically extending hinge assemblies 24 and one pair of upstanding marginal edges of the plates 20 are hingedly supported from upstanding marginal edge portions of the mounting plate 18 by means of similar vertically extending hinge assemblies 26. The edges of corresponding plates 20 and 22 remote from the plates 18 and 16 are hingedly joined together by means of further hinge assemblies 28.

The rear side of the base plate 16 includes upper and lower pairs of rearwardly projecting mounts 30 from which corresponding end portions of two pairs of fluid cylinders 32 are pivotally mounted as at 34 and the other pair of corresponding ends of the fluid cylinders 32 are pivotally anchored as at 36 to the plates 22. Accordingly, the fluid cylinders 32 may be extended in order to displace the mounting plate 18 away from the base plate 16 and may be retracted in order to retract the mounting plate 18 toward the base plate 16.

A plurality of elongated support arms 40 are arranged in vertically spaced horizontal rows of support arms 40 and include base end portions 42 journaled through the mounting plate 18 by means of journal sleeves 44 and the rear ends of the arms 40 have gear wheels 46 mounted thereon. In addition, the mounting plate 18 rotatably supports a plurality of third gears 48 disposed between and in matched engagement with corresponding gear wheels 46 and in this manner the gear wheels 46 are mounted for equal and simultaneous oscillation. A third fluid cylinder 50 has one end anchored relative to the mounting plate 18 as at 52 by means of a pivotal connection therewith and the other end of the third fluid cylinder 50 is pivotally anchored as at 54 to the outer free end of a crank arm 56 carried by one of the gear wheels 46. Accordingly, upon extension and retraction of the fluid cylinder 50, the gear wheel 46 supporting the crank arm 56 as well as all of the other gear wheels 46 will be oscillated back and forth. It is to be noted that the fluid cylinder 50 will be capable of oscillating the gear wheel 46 from which the crank arm 56 is supported through an arc of substantially 180 degrees.

Each of the arms 40 includes a longitudinally extending slot 58 formed therein of substantially T-shaped cross section and a plurality of plate-like bodies 60 including base portions 62 of generally T-shaped cross section are supported from each of the arms 40 with the base portions 62 keyed in the slot 58. The plate-like bodies 60 include slightly convex outer edges 64 and have recesses 66 formed therein. Each of the recesses 66 includes an inclined open outer end portion 68 and a wider closed generally circular inner end portion 70. The outer end portions 68 open outwardly through the convex edges 64 and are inclined toward the mounting plate 18.

In operation, the picker 10 has its mobile chassis (not shown) advanced into position adjacent a fruit tree 72 and the boom 14 is positioned whereby the outer face of the mounting plate 18 opposed the tree 72. Then, the cylinders 32 are extended in order to displace the mounting plate 18 outwardly away from the base plate 16 toward the tree 72 in order that the arms 40 may penetrate between the limbs of the tree 72. After the arms 40 have been advanced into the tree limb area, the cylinder 50 is actuated so as to angularly displace the arms 40 to positions with the recesses 66 opening in a horizontal direction. Thereafter, the boom 14 is moved in a horizontal direction in which the recesses 66 open and the cylinders 32 are retracted so as to withdraw the arms 40 from the tree 72 while at the same time the cylinder 50 is actuated to angularly displace the arms 40 approximately 90 or 180 degrees. As the arms 40 are withdrawn from the limb areas of the tree 72, fruit bearing twigs or branches slide along the convex outer edges 64 of the plate-like bodies 60 and into the outer end portion 68 of the recesses 66. As the twigs or small fruit bearing branches move into the inner end portions 70 of the recesses 66, while the arms 40 are being withdrawn from the tree 72 and being angularly displaced 90 to 180 degrees, the leaves and twig portions adjacent but spaced from the fruit to be picked pass through the larger width dimension inner end portions 70 until the fruit to be picked engages the plate-like body 60 and is stripped from the supporting twigs or small branches. Thus, the larger dimension inner end portions 70 of the recesses 66 enable fruit to be picked from the tree 72 with little damage to the leaves and small twigs or branches of the tree.

Figure 5:
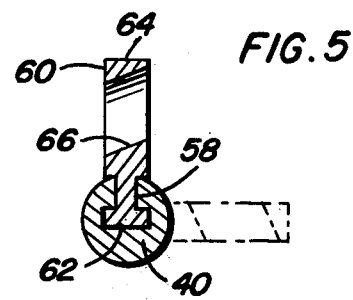
FIG. 5 is an enlarged, vertical sectional view taken substantially upon the plane indicated by the section line 5—5 of FIG. 4.

From FIG. 5 of the drawings, it may also be seen that the surfaces defining the recesses 66 are inclined whereby these surfaces are less likely to cause damage to the leaves and small branches of the tree 72 as fruit is being stripped therefrom.

Figure 6:
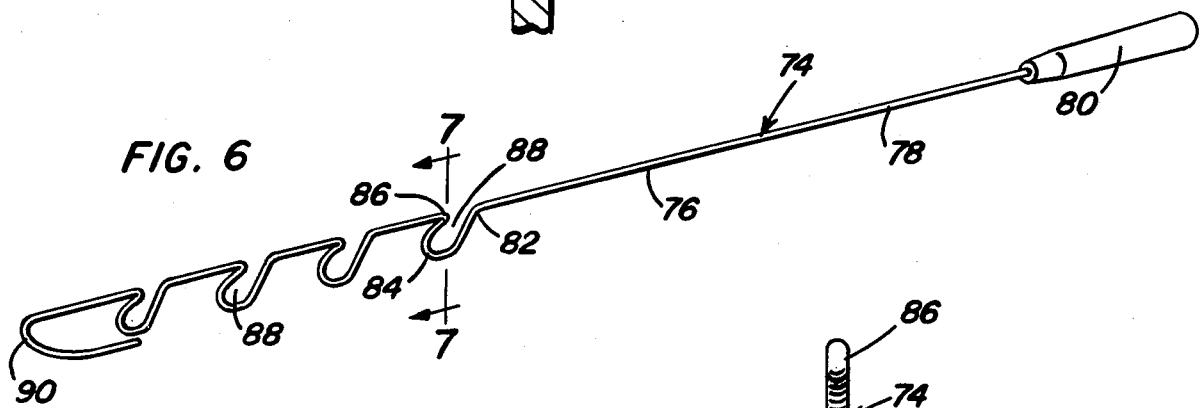
FIG. 6 is a perspective view of a simplified manually actuatable form of fruit picker constructed in accordance with the present invention.
Figure 7:
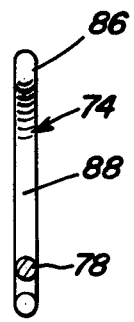
FIG. 7 is an enlarged, sectional view taken substantially upon the plane indicated by the section line 7—7 of FIG. 6.

With attention now invited more specifically to FIGS. 6 and 7 of the drawings, there will be seen a simplified manually actuatable form of the invention referred to in general by the reference numeral 74. The picker 74 comprises an elongated arm 76 constructed of a single piece of rod material 78. One end of the arm 76 has a handle 80 supported therefrom and the arm 76 has longitudinally spaced groups of alternately reversing bends 82, 84 and 86 formed therein to define recesses 88 corresponding to the recesses 66. Further, the free end of the arm 76 is curved as at 90 to facilitate the insertion of the picker 74 between closely spaced fruit bearing branches of the tree 72.

With attention now invited more specifically to FIGS. 8 through 10 of the drawings, there will be seen a third form of the picker referred to in general by the reference numeral 92. The picker 92 comprises a head assembly referred to in general by the reference numeral 94 supported from a boom 96 corresponding to the boom 14. The head 94 defines a vertically elongated horizontally outwardly opening generally semi-cylindrical body 98 whose lower end is closed and provided with an outlet neck 100 to which the inlet end of a fruit collecting hose 102 is connected. The body 98 rotatably supports a support shaft 104 across its open side 106 and the shaft 104 includes an upper end portion provided with an input gear 108 with which a drive gear 110 of an electric motor 112 is drivingly meshed. The shaft 104 has a plurality of disk-shaped bodies 114 mounted thereon with sleeves 116 provided on the shaft 104 as spacing sleeves between the disk-shaped bodies 114 and the bodies 114 are keyed to the shaft 104 for rotation therewith.

The outer periphery of each disk-shaped body 104 includes peripherally spaced outwardly opening notches 118 in which panel-like bodies 120 corresponding to the panel-like bodies 60 are removably anchored. The bodies 120 include recesses 122 corresponding to the recesses 66 including narrow width outer end portions 124 and greater width substantially circular inner end portions 126. Then, the gear reduction motor 112 is actuated to drive the shaft 104 at slow speed and the disk-shaped bodies 114 have the peripheral portions thereof projecting outwardly of the body 98 advanced between the limbs of the tree 72 and fruit bearing stems and small branches will be received within the recesses 22 and the fruit supported therefrom will be stripped from the tree 72 and fall downwardly into the lower portion of the body 98 and outwardly therefrom through the outlet neck 100 and into the hose 102, whereby the fruit picked from the tree 72 may be directed to a convenient collection location.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fruit picking apparatus includng an elongated arm defining base and free ends, said arm including means defining elongated outwardly opening fruit stem receiving notches spaced therealong and opening outwardly of said arm in a direction inclined toward said base end of said arm, said notches including open opposite sides opening outwardly in opposite directions at right angles to said direction, the width of the open ends of said notches being sufficient to loosely receive fruit supporting stem portions and their leaves therethrough, a mount, a plurality of said arms supported in spaced parallel relation from said mount with the free ends of said arms projecting outwardly from one side of said mount and said base ends of said arms mounted from said mount for simultaneous oscillatory angular displacement relative thereto about axes extending longitudinally of said arms, said notches being confined to corresponding longitudinal sides of said arms, said arms comprising elongated rod members each including a longitudinally extending support groove formed therein, said notches being defined in plate-like members including base portions keyed in the corresponding groove.

2. The combination of claim 1 wherein each of said plate-like members defines a convex, outer edge extending longitudinally of the corresponding arm, said notches including narrow open outer ends and wider closed inner ends, said outer ends opening outwardly through said outer edges.

3. The combination of claim 1 including a mobile platform, support means supporting said mount from said platform for back and forth movement of said mount relative to said platform along a path generally paralleling said arms.

4. The combination of claim 3 wherein said notches include narrow open outer ends and wider closed inner ends.

5. The combination of claim 4 wherein said closed inner ends are generally circular in configuration.

6. The combination of claim 4 wherein said narrow open outer ends are outwardly inclined toward the base ends of said arms.

* * * * *